(12) United States Patent
Schwarz

(10) Patent No.: US 6,332,645 B1
(45) Date of Patent: Dec. 25, 2001

(54) SEALING ARRANGEMENT FOR A MOTOR VEHICLE SLIDING ROOF, SLIDING AND LIFTING ROOF, SPOILER ROOF, LOUVERED ROOF OR THE LIKE

(75) Inventor: Markus Schwarz, Titisee-Neustadt (DE)

(73) Assignee: Webasto Karosseriesysteme GmbH, Stockdorf (DE)

(*) Notice: Subject to any disclaimer, the term of this patent is extended or adjusted under 35 U.S.C. 154(b) by 0 days.

(21) Appl. No.: 09/349,094

(22) Filed: Jul. 8, 1999

(51) Int. Cl.7 .......................................................... B60J 7/00
(52) U.S. Cl. ............... 296/216.09; 296/213; 296/216.02; 49/476.1; 49/484.1
(58) Field of Search ......................... 296/216.06–216.09, 296/213, 216.02, 219, 220.01; 49/476.1, 484.1

(56) References Cited

U.S. PATENT DOCUMENTS

| | | | |
|---|---|---|---|
| 4,729,596 | * | 3/1988 | Fujihara et al. ............. 296/216.06 X |
| 5,197,779 | * | 3/1993 | Mizuno et al. .................. 296/220.01 |
| 5,836,642 | * | 11/1998 | Salz ............................. 296/220.01 X |

FOREIGN PATENT DOCUMENTS

| | | | |
|---|---|---|---|
| 3100757 | * | 12/1981 | (DE) ................................ 296/216.06 |
| 44 43 525 | | 2/1996 | (DE) ..................................................... |

* cited by examiner

*Primary Examiner*—Dennis H. Pedder
(74) *Attorney, Agent, or Firm*—Nixon Peabody LLP; David S. Safran

(57) ABSTRACT

Sealing arrangement for a gap (3) between adjacent cover edges of two adjustable cover elements (1, 2) which lie behind one another in their closed position, i.e., cover elements of a motor vehicle sliding roof, sliding and lifting roof, spoiler roof, louvered roof or the like. In the gap area, at least one sealing element (6, 7) which is elastic at least in areas is attached to each of the two cover elements (1, 2) or to the frame parts (13 and 14) which are associated therewith. The two sealing elements (6, 7) are arranged symmetrically along the cover edges of the two cover elements (1, 2), and the two sealing elements overlap one another with sealing lips (11, 12) to form a seal in the gap area in the closed position of the cover elements (1, 2). The elasticity and shape of the sealing elements are such that the sealing elements allow mutual tilting and/or vertical adjustment movements of the two cover elements.

14 Claims, 2 Drawing Sheets

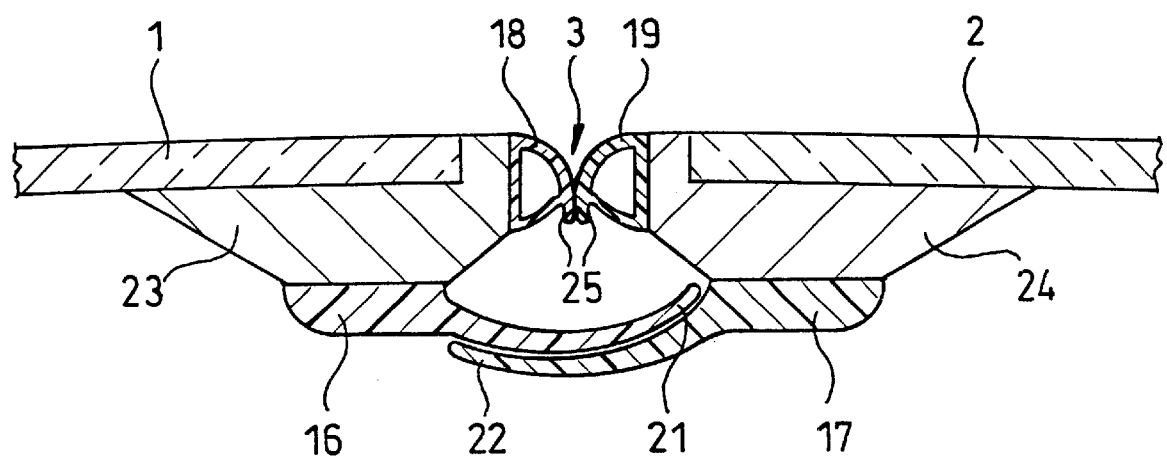
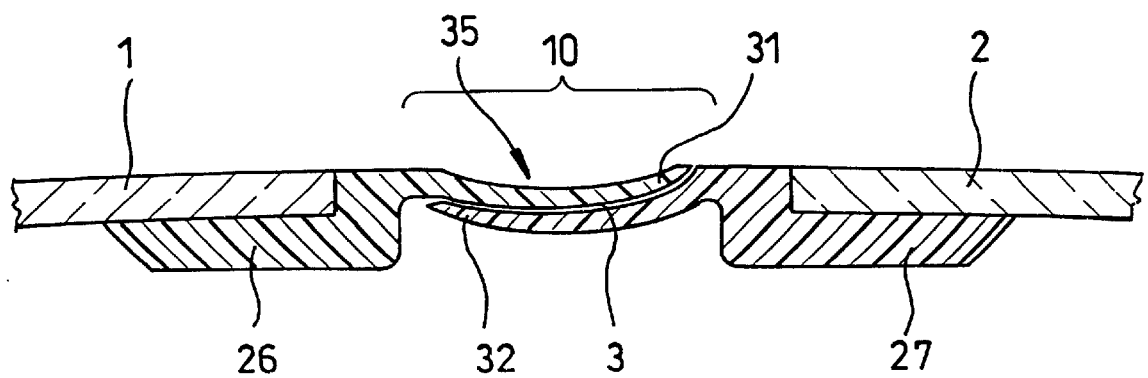

SEALING ARRANGEMENT FOR A MOTOR VEHICLE SLIDING ROOF, SLIDING AND LIFTING ROOF, SPOILER ROOF, LOUVERED ROOF OR THE LIKE

BACKGROUND OF THE INVENTION

1. Field of the Invention

This invention relates to a sealing arrangement for the gap between adjacent cover edges of two adjustable cover elements which lie one behind the other in their closed position, i.e., cover elements of a motor vehicle sliding roof, sliding and lifting roof, spoiler roof, louvered roof or the like, with a sealing element which is elastic, at least in areas, and which is attached to a cover element in the gap area.

2. Description of Related Art

In a known sealing arrangement of the type to which the invention is directed (German Patent DE 44 43 525 C1), the sealing element is located on a water drain of the cover element which is the rear, and this sealing element has an elastically bendable sealing section which is molded on in one piece, and which can be moved by an impact edge of the cover element which is forward of it, depending on the opening and closing motion thereof, between a relieved rest position which is raised upwardly and which forms a splash-proofing, and a loaded position which covers over the drain. In the case of the known sealing arrangement, proceeding from the closed position of the cover elements, the front cover element with its impact edge is raised relative to the rear cover element or vice versa, the rear cover element with its drain is lowered relative to the front cover element. But, it is not possible, proceeding from the closed position, to raise the rear cover element with its drain relative to the front cover element or to lower the front cover element with its impact edge relative to the rear cover element. As a result of the configuration of the sealing arrangement, therefore, the mutual adjustability of the cover elements is limited.

SUMMARY OF THE INVENTION

The object of the invention is to devise a sealing arrangement which can be used in a more versatile manner and which especially allows, proceeding from the closed position of the cover elements, selectively raising or lowering one cover element with its edge facing the other cover element and/or the other cover element with its edge facing the one cover element.

This object is achieved, proceeding from a sealing arrangement of the initially mentioned type, by a sealing element, which is elastic at least in areas, being attached in the same way to the other cover element in the gap area, by the two sealing elements being located along the cover edges of the two cover elements and overlapping one another to form a seal in the closed position of the cover elements in the gap area, and by the elasticity and shape of the sealing elements being such that the sealing elements allow mutual tilting and/or vertical adjustment movements of the two cover elements.

When using the sealing arrangement in accordance with the invention, the adjacent cover edges of two cover elements can be raised up completely independently of one another from the closed position or lowered down while in the closed position, yet fault-free sealing of the gap between the adjacent cover edges is ensured. For operation of the sealing system, it also makes no difference which of the two cover elements is moved first into the closed position.

Preferably, the two sealing elements are made at least roughly mirror-image identical.

In another embodiment of the invention, the overlapping parts of the sealing elements are made elastic.

The overlapping parts of the sealing elements can run essentially in directions parallel to the extension of the cover elements. In particular, they can be arched or kinked. Each of the sealing elements can advantageously be attached in the conventional manner (above mentioned German Patent DE 44 43 525 C1) to a gutter which fits under the respective cover edge in the closed position of the associated cover element, and which for its part, is connected to the pertinent cover element. Instead of or additionally, each of the sealing elements itself can form an elastic gutter which fits under the respective cover edge in the closed position of the corresponding cover element.

Auxiliary seals can be attached to each of the cover edges themselves.

According to a modified embodiment of the invention, each of the sealing elements can form an elastic gutter which projects above the respective cover edge in the direction toward the adjacent cover edge.

The part of the sealing elements which forms the gutter is preferably concavely curved.

Preferred embodiments of the invention are explained below with reference to the attached drawings.

BRIEF DESCRIPTION OF THE DRAWINGS

FIG. 2 is a schematic sectional view of a modified embodiment of the sealing arrangement; and FIG. 3 is a schematic sectional view of a further modified embodiment of the sealing arrangement.

DETAILED DESCRIPTION OF THE INVENTION

Figure 1:
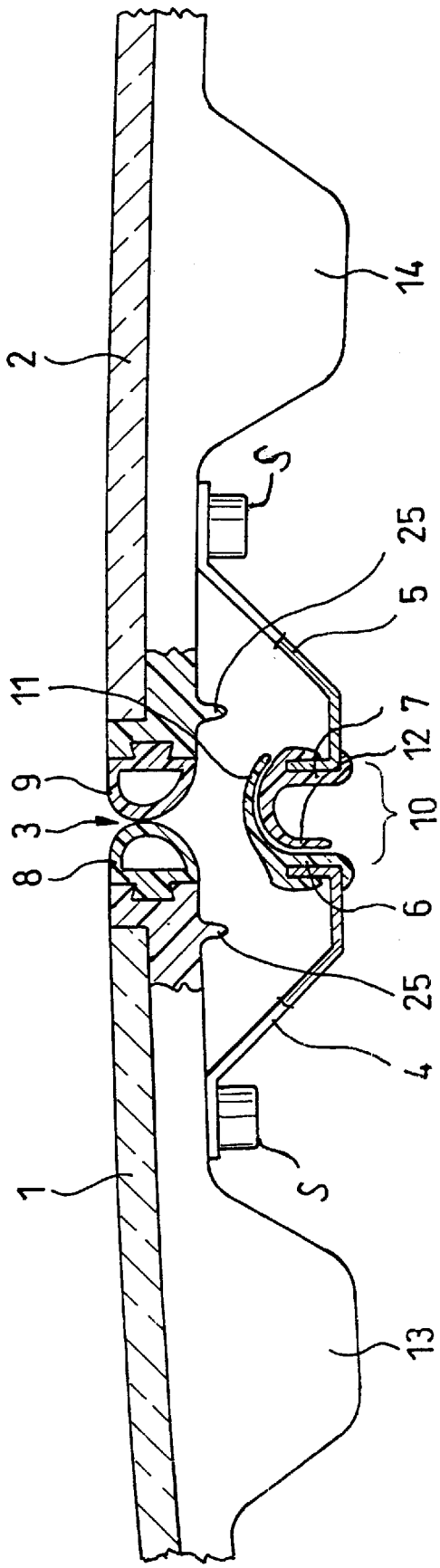
FIG. 1 is a schematic sectional view of a first embodiment of the sealing arrangement.

In the embodiment shown in FIG. 1, on adjustable cover elements 1, 2 of a motor vehicle sliding roof, sliding and lifting roof, spoiler roof, louvered roof or the like, which lie one behind the other in their closed position in the manner shown, edge seals 8, 9, here in the form of hollow chamber seals, are each peripherally attached to a respective one of the cover element frame parts 13, 14. The edge seals 8, 9 seal the gap 3 formed between the cover elements 1, 2, acting as in conventional sliding roofs both as a seal and for noise abatement. Gutters 4, 5 are attached to the frame parts 13, 14 of the cover elements 1, 2, for example, by by screws S in the manner shown. An intermediate space 10 is formed between the gutters 4, 5 underneath the gap 3 sealed by edge seals 8, 9. The intermediate space 10 is made so large that either the cover element 1 can be lowered passed the cover element 2 or that, vice versa, the cover element 2 can be lowered passed cover element 1.

A sealing element 6, 7 is placed on each of the gutters 4, 5. The sealing elements 6, 7 are arranged mirror-symmetrically along the cover edges of the two cover elements 1 and 2, i.e., the edges which are opposite one another in the closed position of the cover elements. The sealing elements 6, 7 have a sealing lip 11, 12, respectively, which is arched upward, cantilevered in a direction essentially parallel to the longitudinal extension of the cover elements 1, 2. The sealing lips 11, 12 are underneath the gap 3 in the closed position of the cover elements 1, 2, and in this position, they overlap one another to form a seal in the gap area, by which the intermediate space 10 is closed. In addition, the upper of the two sealing lips acts as a cover which routes entering water into the gutters 4, 5. At least the part of the sealing elements 6, 7 which forms the sealing lips 11, 12 is elastic. The elasticity and shape of the sealing elements 6, 7, and especially of the sealing lips 11, 12, are such that the sealing elements allow mutual tilting and/or vertical adjustment motions of the two cover elements 1, 2. Therefore, the sealing elements 6, 7 do not hinder the cover elements 1,2 when they move; their sealing lips 11, 12 are simply pushed away. Depending on which cover element 1 or 2 first assumes the closed position shown in the FIG. 1, either the sealing lip 11 rests on the sealing lip 12, or vice versa, the sealing lip 12 rests on the sealing lip 11.

If water penetrates through between the seals 8, 9, it drips onto the sealing lips 11 and 12, which are upwardly arched in the manner of a roof and is routed into the gutters 4 and 5. Drip edges 25 on the bottom of the frame parts 13, 14, alternatively on the bottoms of the seals 8, 9, provide for controlled routing of the water penetrating through the gap 3 into the gutters 4, 5 and prevent moisture from progressing further along the inside of the cover elements 1 and 2. From the gutters 4, 5, the water is routed out of the vehicle, again, in a conventional manner via other gutters, water drain hoses and the like which run in or on lateral frame parts of the vehicle.

Instead of being arched, the sealing lips 11 and 12 can also be peaked (inverted V-shape) in the manner of a roof. Optionally, the sealing elements 6, 7 can be molded onto gutters 4, 5 or can be joined thereto in some other way.

In the embodiment as shown in FIG. 2, sealing elements 16, 17 are each attached to a respective frame part 23; 24 of the cover elements 1, 2 and have elastic sealing lips 21, 22. Analogously to the sealing lips 11, 12, the sealing lips 21, 22 are located underneath the gap 3 in the closed position of the cover elements 1, 2. In this position, the lips 21, 22 overlap one another to form a seal in the gap area, and as a result of their upwardly concave shell shape, top they themselves form a gutter which captures water which has penetrated the gap 3. From there, the water is drained off in the manner outlined above.

Depending on which cover element assumes the closed position first, either the sealing lip 21 or the sealing lip 22 is uppermost. This make no difference for the functioning of the sealing system due to the symmetrical arrangement of the sealing elements 16, 17. If any cover edge of the cover elements 1, 2 is raised up or lowered down, the two sealing lips 21, 22 are pushed away and deformed as is necessary for the cover to move.

The edge seals 18, 19 which seal the gap 3 are, in turn, made as hollow chamber seals; but, in this embodiment, they are each provided with a drip edge 25.

FIG. 3 shows an embodiment in which the sealing elements 26, 27 are attached directly to the cover elements 1, 2 and are arranged such that they run symmetrically to one another in the visible area along the opposed cover edges. The sealing elements 26, 27 are provided with elastic sealing lips 31, 32 which themselves seal the gap 3. The sealing lips 31, 32 overlap in the area of the intermediate space 10 when the roof system is closed. In this embodiment of the invention, the sealing lips 31, 32 which are on top of one another form an external, trough-shaped gutter 35 which laterally drains away the water which is incident on the sealing elements 26, 27. The design can be made such that no water penetrates through the gap.

Depending on which of the cover elements 1, 2 assumes the closed position first, in this case, either the sealing lip 31 or the sealing lip 32 is uppermost, without this affecting the functioning of the sealing system. If one or the other cover edge of the cover elements 1, 2 is raised up or lowered down, the two sealing lips 31, 32 are pushed away and deformed as required for the cover to move.

Thus, it is apparent that in all of the embodiments, at least part of the movements of the two sealing elements, e.g., 6, 7; 16, 17; 26, 27, are mutually controlled.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second of the cover elements; wherein the two sealing elements are located along the cover edges of the two cover elements and have flap-shaped projecting parts which overlap one another to seal a gap area between the cover edges in the manner of a roof in the closed position of the cover elements; and wherein the elasticity and shape of the sealing elements are such that the sealing elements allow each one of the cover edge of the first cover element and the cover edge of the second cover element to be selectively raised relative to the other of the cover edge of the first cover element and the cover edge of the second cover element without breaking said overlap.

2. Sealing arrangement as claimed in claim 1, wherein the two sealing elements are at least roughly mirror-image identical.

3. Sealing arrangement as claimed in claim 2, wherein the overlapping parts of the sealing elements are elastically flexible.

4. Sealing arrangement as claimed in claim 1, wherein the overlapping parts of the sealing elements are elastically flexible.

5. Sealing arrangement as claimed in claim 1, wherein the overlapping parts of the sealing elements are cantilevered in directions essentially parallel to a longitudinal extension of the cover elements.

6. Sealing arrangement as claimed in claim 1, wherein the overlapping parts of the sealing elements have one of an arched and peaked shape.

7. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second cover element; wherein the two sealing elements are located along the cover edges of the two cover elements; wherein each of the two sealing elements has an elastically flexible sealing lip;

wherein said elastically flexible sealing lips are flap-shaped projections which overlap one another to seal a gap area between the cover edges in the manner of a roof in the closed position of the cover elements; and wherein the elasticity and shape of the sealing lips are such that the sealing elements allow at least one of tilting and vertical movements of the cover elements relative to each other without breaking said overlap.

8. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second of the cover elements; wherein the two sealing elements are located along the cover edges of the two cover elements and have parts which overlap one another to seal a gap area between the cover edges in the manner of a roof in the closed position of the cover elements; and wherein the elasticity and shape of the sealing elements are such that the sealing elements allow at lease one of tilting and vertical movements of the cover elements with respect to each other, wherein each of the sealing elements is attached to a gutter which is connected to a respective one of the cover elements and is positioned under the respective cover edge.

9. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second of the cover elements; wherein the two sealing elements are located along the cover edges of the two cover elements and have parts which overlap one another to seal a gap area between the cover edges in the manner of a roof in the closed position of the cover elements; and wherein the elasticity and shape of the sealing elements are such that the sealing elements allow at lease one of tilting and vertical movements of the cover elements with respect to each other, wherein each of the sealing elements forms an elastic gutter which is located under a respective cover edge.

10. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second of the cover elements; wherein the two sealing elements are located along the cover edges of the two cover elements and have parts which overlap one another to seal a gap area between the cover edges in the manner of a roof in the closed position of the cover elements; wherein the elasticity and shape of the sealing elements are such that the sealing elements allow at lease one of tilting and vertical movements of the cover elements with respect to each other, wherein each of the sealing elements has a part which forms an elastic gutter which projects from a respective one of the cover edges in a direction toward an adjacent one of the cover edges, and wherein the part of the sealing elements which forms the gutter has an upwardly facing concave curvature.

11. Sealing arrangement at a gap between adjacent cover edges of two adjustable cover elements which lie one behind the other in a closed position of cover elements of a displaceable motor vehicle roof, comprising a first sealing element which is elastic at least in areas and which is attached to one of a first one of the two cover elements and a frame part connected to the first cover element; a second sealing element which is elastic at least in areas and which is attached to one of a second one of the two cover elements and a frame part connected to the second of the cover elements; wherein the two sealing elements are located along the cover edges of the two cover elements and have flap-shaped projecting parts which overlap one another over a major portion of a length thereof to seal a gap area between the cover edges in the manner of a roof in the closed position of the cover elements; and wherein the elasticity and shape of the sealing elements are such that the sealing elements allow at lease one of tilting and vertical movements of the cover elements with respect to each other, and wherein which one of the first sealing element and the second sealing element has a part which overlays the other of the first sealing element and the second sealing element depends upon which of the first and second sealing elements first assumes a closed position.

12. Sealing arrangement as claimed 8, wherein auxiliary seals are attached to each of the cover edges themselves.

13. Sealing arrangement as claimed in claim 9, wherein auxiliary seals are attached to each of the cover edges themselves.

14. Sealing arrangement as claimed in claim 13, wherein the part of the sealing elements which forms the gutter has an upwardly facing concave curvature.

\* \* \* \* \*